(12) United States Patent
Russke

(10) Patent No.: US 6,502,891 B2
(45) Date of Patent: Jan. 7, 2003

(54) CONVERTIBLE VEHICLE

(75) Inventor: Klaus Russke, Bissendorf (DE)

(73) Assignee: Wilhelm Karmann GmbH, Osnabrueck (DE)

( * ) Notice: Subject to any disclaimer, the term of this patent is extended or adjusted under 35 U.S.C. 154(b) by 0 days.

(21) Appl. No.: 09/846,796

(22) Filed: May 1, 2001

(65) Prior Publication Data

US 2001/0045759 A1 Nov. 29, 2001

(30) Foreign Application Priority Data

May 2, 2000 (DE) .......................................... 100 21 340

(51) Int. Cl.⁷ .................................................. B60J 7/00
(52) U.S. Cl. .................................. 296/107.17; 296/108
(58) Field of Search ............................. 296/108, 107.17

(56) References Cited

U.S. PATENT DOCUMENTS

| | | | | |
|---|---|---|---|---|
| 4,936,626 A | * | 6/1990 | Gmeiner et al. | |
| 5,769,483 A | * | 6/1998 | Danzl et al. | |
| 5,979,970 A | * | 11/1999 | Rothe et al. | |
| 6,336,673 B1 | * | 1/2002 | Rothe et al. | |
| 2001/0040385 A1 | * | 11/2001 | Obendiek | |

\* cited by examiner

*Primary Examiner*—D. Glenn Dayoan
*Assistant Examiner*—Scott Carpenter
(74) *Attorney, Agent, or Firm*—Jordan & Hamburg LLP

(57) ABSTRACT

Convertible vehicle including a first movement unit including first and second separate roof parts and a second movement unit including a third roof part separate from the first and second roof parts and situated rearward of the first and second roof parts. The roof can be stowed in a rear region of the vehicle. A main support is arranged at an edge of the roof. A first supporting part is connected to the first movement unit and is pivotally mounted to the main support while a second supporting part is connected to the second movement unit and is also pivotally mounted to the main support. A coupling rod couples the supporting parts together. One or more intermediate linkage connects a respective supporting part to the coupling rod.

31 Claims, 3 Drawing Sheets

CONVERTIBLE VEHICLE

BACKGROUND OF THE INVENTION

Figure 1:
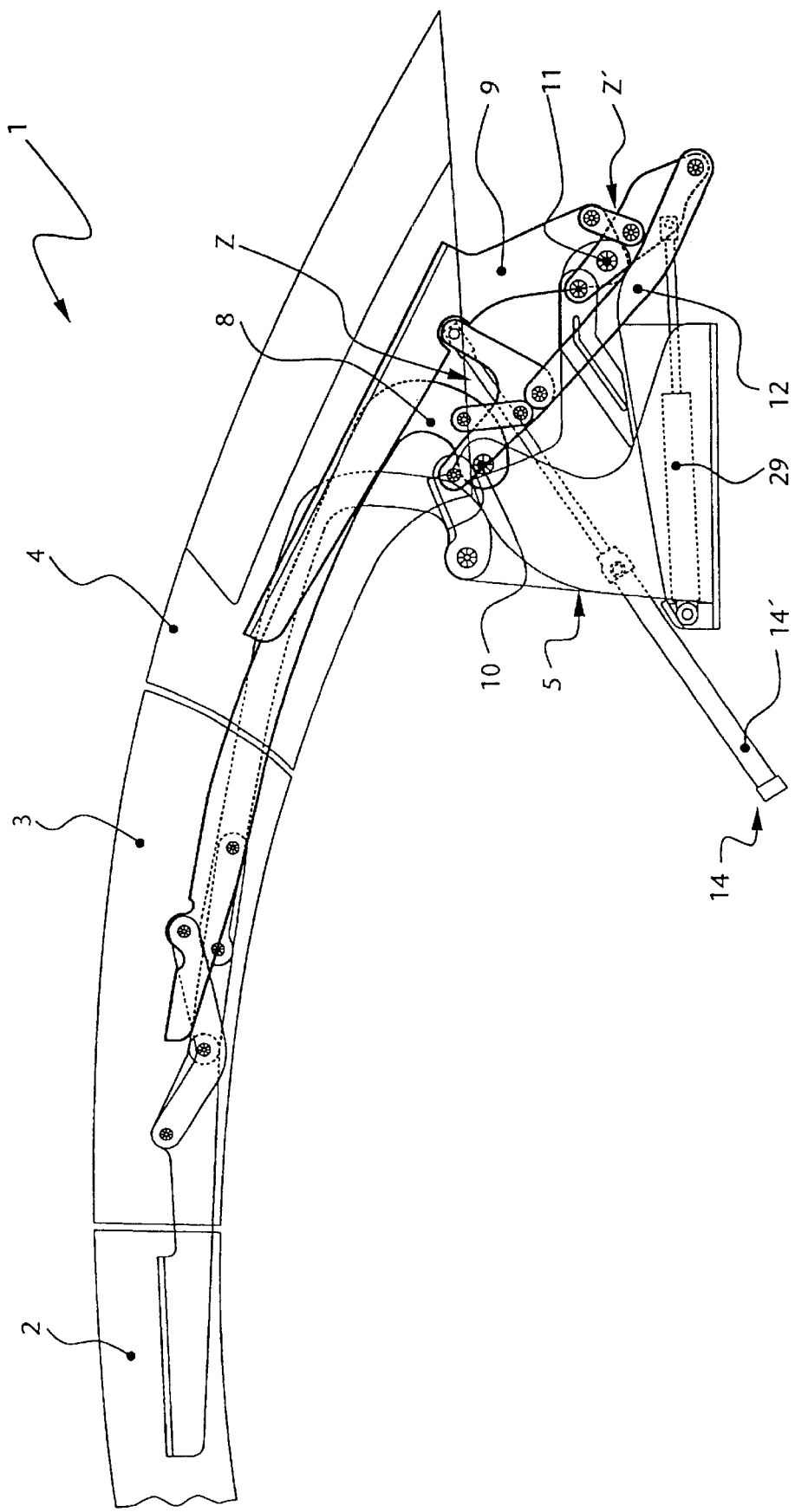

The invention relates to a convertible vehicle with a roof comprising at least three separate roof parts.

The invention relates to the problem of improving a convertible vehicle of the type known from German Patent Publication No. DE 299 13 486 U1, so that linkage units, provided to move roof parts of the convertible vehicle, can be moved with less driving power and, when the roof parts are shifted jointly, a decrease in the stresses on the material is possible in the region of the drag bearing.

SUMMARY OF THE INVENTION

In other to achieve this objective, a convertible vehicle in accordance with the invention includes three separate roof parts, two of which are formed into a first movement unit and one of which constitutes a second movement unit which is situated rearward of the first movement unit. The roof can be stowed in a rear region of the vehicle. A main support is arranged at an edge of the roof. A first supporting part is connected to the first movement unit and is pivotally mounted to the main support while a second supporting part is connected to the second movement unit and is also pivotally mounted to the main support. A coupling rod couples the supporting parts together.

In the region of its two movement units, the roof constructed in accordance with the invention has at least one intermediate linkage for controlling adjustment of the roof parts in the region of the main support. By means of the intermediate linkage(s), reduced adjusting forces can be imparted to the supporting parts of the two movement units which are connected over the coupling rod. This is due in part to the fact that a one-step motion reduction of the driving movement takes place. This is advantageous especially in the respective initial and end phases during the opening or closing process, because in these phases of the movement of the roof parts, the adjustment forces, brought about especially by the locking position and/or the dead center position of the linkage parts, can be minimized and the driving power for initiating the movement can also be reduced with the intermediate linkage or linkages. During the adjustment movement of the roof parts, a movement, gentle to the material, is achieved in the region of the movement units, having a plurality of linkage legs, in the course of the whole path of the movement with largely constant driving forces.

By means of an appropriate optimization of the fulcrums and lever ratios in this system of linkages, the mechanical advantage of the intermediate linkage can be varied in the region of the linkage elements as a function of the force and velocity so that, with little effort, an adaptation to different roof systems is possible. In addition, for the stowing phase of the roof parts, a gas spring is integrated as a damping element in the force flux. With the damping spring, a controlled stowing of the roof is possible and the subsequent shifting of the roof into the closed position is supported actively.

Further details of the invention arise out of the following description and the accompanying drawings.

IN THE DRAWINGS

Figure 2:
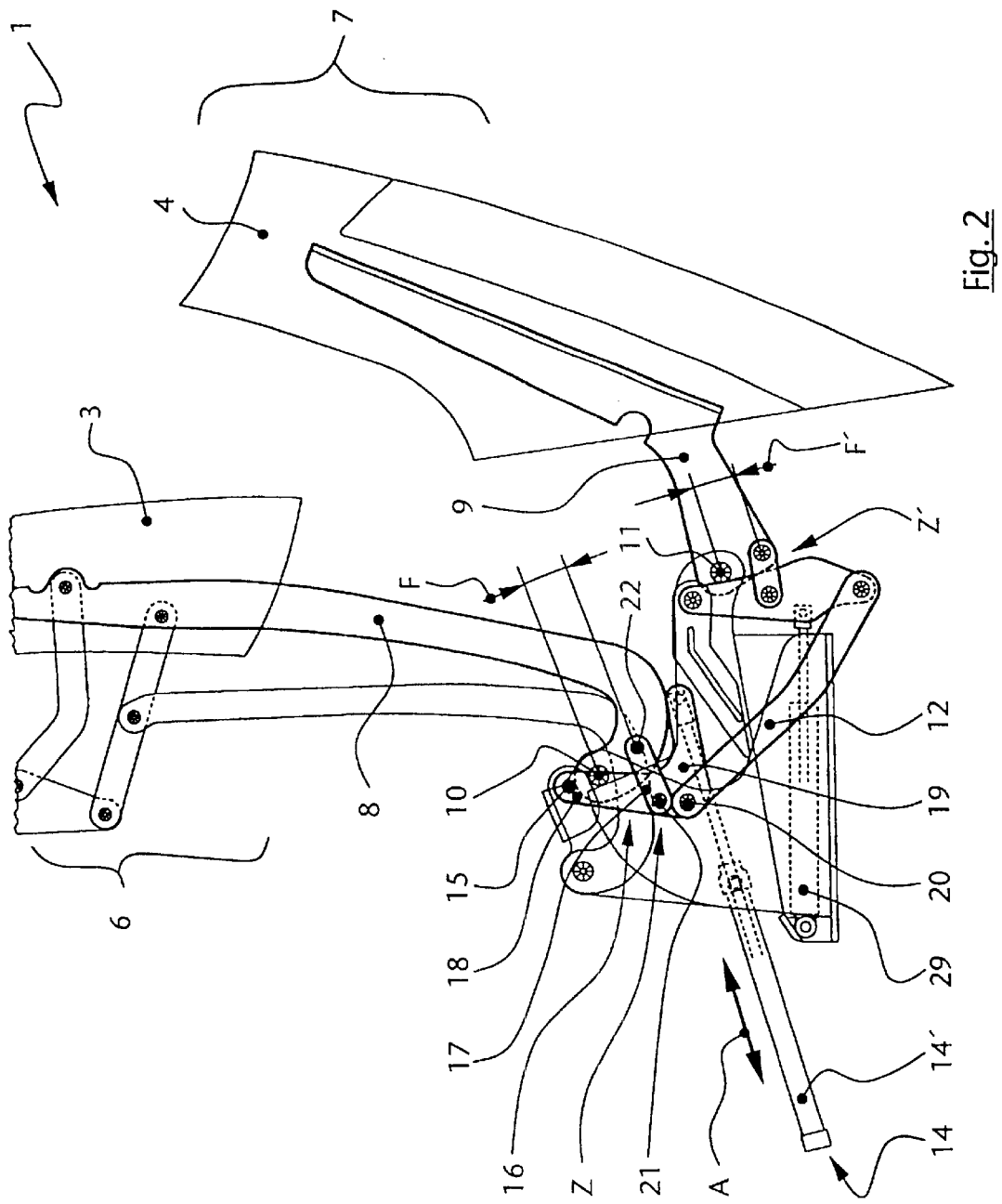
Figure 3:
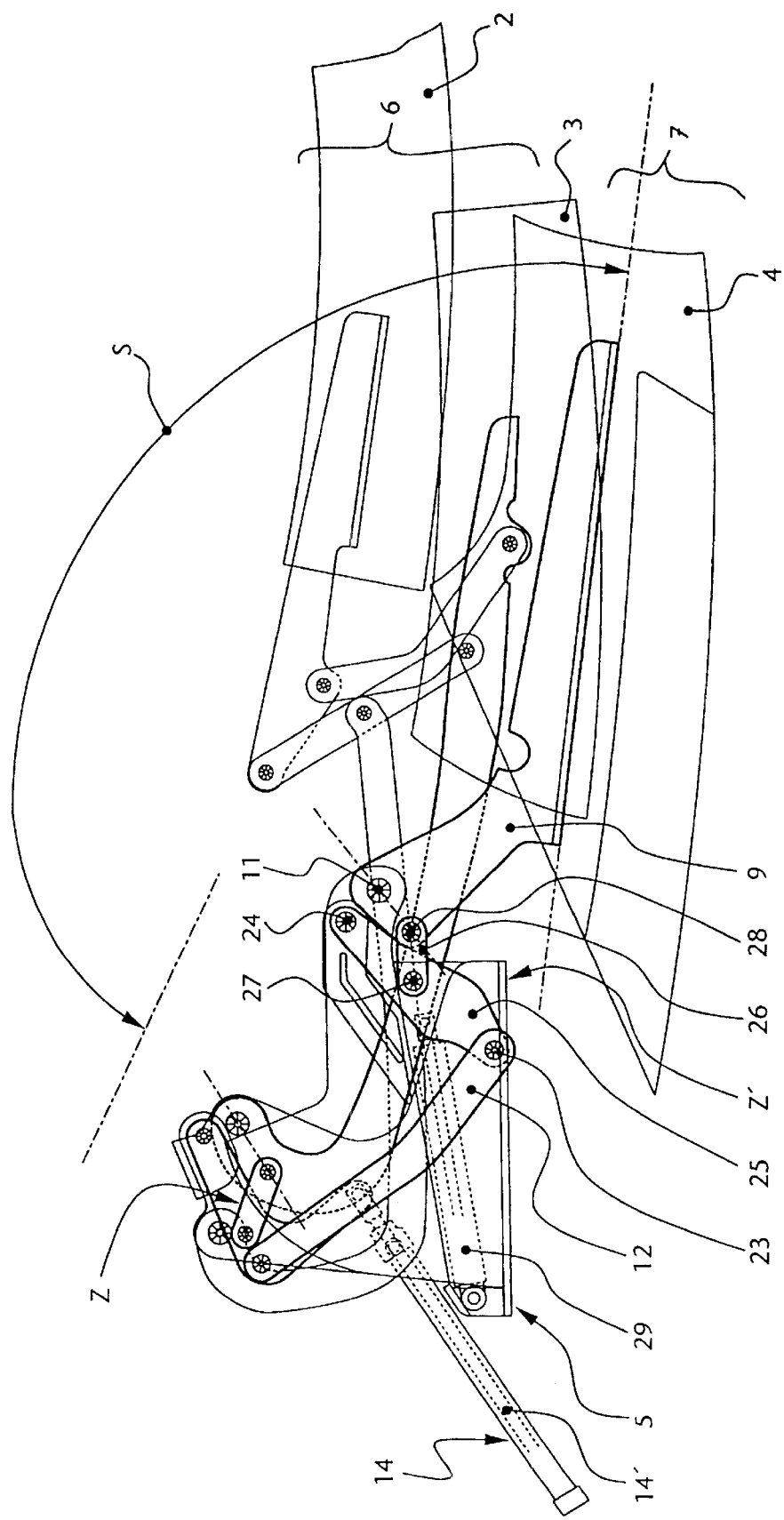

FIG. 1 shows a partially sectional side view of a roof, having three roof parts, of a convertible vehicle in the closed position, FIG. 2 shows a side view similar to that of FIG. 1 during the opening phase of the roof, and FIG. 3 shows a side view of the roof of FIG. 1, shifted into a rear opening position in the vehicle.

DESCRIPTION OF THE PREFERRED EMBODIMENTS

FIG. 1 illustrates a partially sectional side view of a roof 1 of a convertible vehicle, having three roof parts 2, 3 and 4, the details of the remainder of the vehicle are not shown. From the closed position shown in FIG. 1, the roof 1 can be shifted to a rear region of the vehicle into an open position (as shown in FIG. 3). In the region of the respective main supports 5, of which only one is shown in the side view and which is assigned to the edge of the vehicle body (not shown), the roof 1 has a movement unit 6, which comprises the two front parts 2 and 3 of the roof 1 and a rear movement unit 7, which comprises the rear part 4 of the roof 1. The two movement units 6 and 7 are held pivotably at the main support 5 by respective supporting and linkage parts 8 and 9 in step bearings 10 and 11 and a coupling rod 12 is provided as a restricted guidance between these supporting parts 8 and 9.

For the roof 1, constructed in accordance with the invention, the coupling rod 12, in one conceivable construction, is connected at least at one end by an intermediate linkage Z or Z' with the respective supporting part 8 or 9. In the embodiments shown in FIGS. 1 to 3, the coupling rod 12 has in each case one of the intermediate linkages Z and Z' to the front as well as to the rear supporting parts 8 and 9.

With the intermediate linkages Z and Z', a subassembly, bringing about a motion multiplication or division of the driving motion (arrow A, FIG. 2) in the form of a force multiplying linkage system, is provided, with which the rotational speeds or accelerations of the supporting parts 8 and 9 or of the two movement units 6 and 7 can be affected. In this manner, a largely synchronous movement of the parts is possible with little driving power. In particular, a linkage system for the adjusting speeds or accelerations, effective by means of the coupling rod 12 at the supporting parts 8 and 9, can be achieved with the two intermediate linkages Z and Z'.

In an advantageous embodiment of the invention, the roof construction has a driving mechanism 14 which is arranged to control the roof automatically and is constructed as a hydraulic cylinder 14'. This driving mechanism 14 engages the intermediate linkage Z, which is assigned to the front movement unit 6, so that, starting out from the latter, the opening or closing movement of the roof 1 takes place corresponding to the driving movement (arrow A) of the hydraulic cylinder 14'. Likewise, it is conceivable that the driving mechanism 14 is assigned to the intermediate linkage Z' engaging the rear movement unit 7 (not shown).

The front intermediate linkage Z is provided with a driving lever 16, which is supported at the main support 5 in a hinge point 15 and at which the driving mechanism 14, the coupling rod 12 and a rocking arm 17, connected with the supporting part 9 of the movement unit 7, are hinged.

The driving lever 16 is constructed as a rectangular lever, which is pivotably supported at the main support 5 with a first leg part 18 and the second leg part 19 of which, protruding at an angle of 90°, is connected at the end with the piston rod of the hydraulic cylinder 14'. In the corner region between the two 90° leg parts 18 and 19, the coupling rod 12 is hinged in a hinge point 20 at the driving lever 16 such that a synchronous transfer of the movement (arrow A) to the rear intermediate linkage Z' is possible.

The swiveling lever 17 is arranged to transfer movement to the front supporting part 8. It is supported over a hinge point 21 in the vicinity of the hinge point 20 also in the corner region of the angular lever 16. On the other hand, the swiveling lever 17 engages a hinge point 22 at the supporting part 8, so that a distance F, acting as a force-initiating lever, is formed between the hinge point 15 of the supporting part 8 and the hinge point 22.

The rear intermediate linkage Z' has a driving lever 25, which is hinged at the coupling rod 12 in a hinge point 23 and fixed at the other end at the main support 5 in the vicinity of the supporting bearing 11 in a hinge point 24. The driving lever 25, in turn, is connected over a swiveling lever 26 also in the supporting part 9 of the rear movement unit 7. The swiveling lever 26 Moreover is connected in a hinge point 27 with the driving lever 25, the hinge point 27 being disposed essentially centrally between the supporting bearing 11 and the hinge point 23. A hinge point 28 of the swiveling lever 26 is disposed at the supporting part 9 at a distance F' from the supporting bearing 11 of the supporting part 9, so that, with this distance, a rear driving lever is formed which, when motion is initiated, is effective synchronously with the front lever F.

With the above-described two intermediate linkages Z and Z', the large swiveling paths of the roof components 2, 3 and 4 are possible with a defined use of force, so that, by uniform accelerations and movement velocities, overloading of the components is avoided. In FIG. 3, the shifting of the supporting part 9 of the rear movement unit 7 is illustrated by way of example by a movement arrow S, which illustrates the length of a movement path. With the use of the two intermediate linkages Z and Z', lever ratios, unfavorable for joint parts, are avoided on the whole of the movement path S. As such, overall improved force initiation and acceleration conditions are achieved. By an optimum arrangement and dimensioning of the fulcrums and hinge points in the region of the two intermediate linkages Z and Z', an adaptation to different roof configurations is possible with little expenditure for construction.

Due to the use of a gas spring 29, damping of the superimposition of the swiveling movement on the weight force can be achieved when the roof 1 is stowed (FIG. 3) and the roof 1 can be moved in a controlled manner into the stowed position. When the roof 1 is moved into the closed position, the corresponding movement of the roof parts is supported actively by the gas spring 29.

What is claimed is:

1. A convertible vehicle, comprising:
   a first movement unit comprising first and second separate roof parts;
   a second movement unit comprising a third roof part separate from said first and second roof parts and situated rearward of said first and second roof parts;
   a main support arranged at an edge of the roof;
   a first supporting part connected to said first movement unit, said first supporting part being pivotally mounted to said main support;
   a second supporting part connected to said second movement unit, said second supporting part being pivotally mounted to said main support;
   a coupling rod for coupling said first and second supporting parts together; and
   at least one intermediate linkage connecting a respective one of said first and second supporting parts to said coupling rod.

2. The convertible vehicle of claim 1, wherein said first, second and third roof parts are stowable in a rear region of the vehicle when in an open position.

3. The convertible vehicle of claim 1, wherein said at least one intermediate linkage comprises a first intermediate linkage connecting said first supporting part to said coupling rod and a second intermediate linkage connecting said second supporting part to said coupling rod.

4. The convertible vehicle of claim 1, further comprising a driving mechanism connected to said at least one intermediate linkage for applying a driving force to open and close the roof.

5. The convertible vehicle of claim 4, wherein said at least one intermediate linkage is constructed in the form of a force multiplying linkage system for reducing or increasing the driving force provided by said driving mechanism.

6. The convertible vehicle of claim 4, wherein said at least one intermediate linkage is a single intermediate linkage connecting said first supporting part to said coupling rod.

7. The convertible vehicle of claim 4, wherein said at least one intermediate linkage is a single intermediate linkage connecting said second supporting part to said coupling rod.

8. The convertible vehicle of claim 1, wherein said first, second and third roof parts constitute the entire roof of the vehicle.

9. The convertible vehicle of claim 1, wherein said at least one intermediate linkage comprises a single intermediate linkage connecting said first supporting part to said coupling rod and including a driving lever supported on said main support and rotatably connected to said coupling rod.

10. The convertible vehicle of claim 9, further comprising:
    a driving mechanism connected to said intermediate linkage for applying a driving force to open and close the roof; and
    a pivoting lever connecting said driving lever to said first supporting part;
    said driving mechanism and said pivoting lever being rotatably connected to said driving lever.

11. The convertible vehicle of claim 10, wherein said driving lever is constructed as an angular lever having a first leg part pivotally connected to said main support and a second leg part protruding at a 90° angle to said first leg part, said driving mechanism being connected to said second leg part.

12. The convertible vehicle of claim 11, wherein said driving lever is rotatably connected to said coupling rod in a corner region of said driving lever between said first and second leg parts.

13. The convertible vehicle of claim 12, further comprising a bearing for pivotally mounting said first supporting part to said main support.

14. The convertible vehicle of claim 13, wherein said pivoting lever is rotatably connected to said driving lever in said corner region of said driving lever and arranged to engage said driving lever at a distance from said bearing.

15. The convertible vehicle of claim 1, wherein said at least one intermediate linkage comprises a single intermediate linkage connecting said second supporting part to said coupling rod and including a driving lever supported on said main support and rotatably connected to said coupling rod.

16. The convertible vehicle of claim 15, further comprising a pivoting lever connecting said driving lever to said second supporting part.

17. The convertible vehicle of claim 16, wherein said driving lever is connected at a first hinge point to said coupling rod and at a second hinge point to said main support, said pivoting lever being connected to said driving lever at a location approximately halfway between said first and second hinge points.

18. The convertible vehicle of claim 16, further comprising a bearing for pivotally mounting said second supporting part to said main support, said pivoting lever being arranged to engage said second supporting part at a distance from said bearing.

19. The convertible vehicle of claim 1, wherein said coupling rod is provided as a restricted guidance.

20. A convertible vehicle, comprising:
   a first movement unit comprising first and second separate roof parts;
   a second movement unit comprising a third roof part separate from said first and second roof parts and situated rearward of said first and second roof parts;
   a main support arranged at an edge of the roof;
   a first supporting part connected to said first movement unit, said first supporting part being pivotally mounted to said main support;
   a second supporting part connected to said second movement unit, said second supporting part being pivotally mounted to said main support;
   a coupling rod arranged to couple said first and second supporting parts together; and
   intermediate linkage means for connecting at least one of said first and second supporting parts to said coupling rod.

21. The convertible vehicle of claim 20, wherein said intermediate linkage means comprises a first intermediate linkage connecting said first supporting part to said coupling rod and a second intermediate linkage connecting said second supporting part to said coupling rod.

22. The convertible vehicle of claim 20, further comprising driving means connected to said intermediate linkage means for applying a driving force to open and close the roof.

23. The convertible vehicle of claim 22, wherein said intermediate linkage means are constructed in the form of a force multiplying linkage system for reducing or increasing the driving force provided by said driving means.

24. The convertible vehicle of claim 22, wherein said intermediate linkage means consist of a single intermediate linkage connecting one of said first and second supporting parts to said coupling rod.

25. The convertible vehicle of claim 20, wherein said intermediate linkage means comprise a single intermediate linkage connecting said first supporting part to said coupling rod and including a driving lever supported on said main support and rotatably connected to said coupling rod, further comprising:
   driving means connected to said intermediate linkage for applying a driving force to open and close the roof; and
   a pivoting lever connecting said driving lever to said first supporting part;
   said driving means and said pivoting lever being rotatably connected to said driving lever.

26. The convertible vehicle of claim 25, wherein said driving lever is constructed as an angular lever having a first leg part pivotally connected to said main support and a second leg part protruding at a 90° angle to said first leg part, said driving means being connected to said second leg part.

27. The convertible vehicle of claim 26, wherein said driving lever is rotatably connected to said coupling rod in a corner region of said driving lever between said first and second leg parts.

28. The convertible vehicle of claim 27, further comprising a bearing for pivotally mounting said first supporting part to said main support, said pivoting lever being rotatably connected to said driving lever in said corner region of said driving lever and arranged to engage said driving lever at a distance from said bearing.

29. The convertible vehicle of claim 20, wherein said intermediate linkage means comprise a single intermediate linkage connecting said second supporting part to said coupling rod and including a driving lever supported on said main support and rotatably connected to said coupling rod, further comprising a pivoting lever connecting said driving lever to said second supporting part.

30. The convertible vehicle of claim 29, wherein said driving lever is connected at a first hinge point to said coupling rod and at a second hinge point to said main support, said pivoting lever being connected to said driving lever at a location approximately halfway between said first and second hinge points.

31. The convertible vehicle of claim 29, further comprising a bearing for pivotally mounting said second supporting part to said main support, said pivoting lever being arranged to engage said second supporting part at a distance from said bearing.

* * * * *